US010699545B1

United States Patent
Chan et al.

(10) Patent No.: US 10,699,545 B1
(45) Date of Patent: Jun. 30, 2020

(54) SYSTEM AND METHOD FOR ATTACK DETECTION IN WIRELESS BEACON SYSTEMS

(71) Applicant: Logistics and Supply Chain MultiTech R&D Centre Limited, Pok Fu Lam (HK)

(72) Inventors: Chun Fai Aldar Chan, Pok Fu Lam (HK); Man Hon Chung, Pok Fu Lam (HK)

(73) Assignee: Logistics and Supply Chain MultiTech R&D Centre Limited, Pok Fu Lam (HK)

(*) Notice: Subject to any disclaimer, the term of this patent is extended or adjusted under 35 U.S.C. 154(b) by 6 days.

(21) Appl. No.: 16/233,285

(22) Filed: Dec. 27, 2018

(51) Int. Cl.
*G06F 21/55* (2013.01)
*G08B 13/24* (2006.01)
*G06F 17/18* (2006.01)
*H04W 4/80* (2018.01)
*H04W 40/24* (2009.01)
*H04W 76/11* (2018.01)
*G06K 9/62* (2006.01)

(52) U.S. Cl.
CPC ......... *G08B 13/2451* (2013.01); *G06F 17/18* (2013.01); *G06K 9/6297* (2013.01); *H04W 4/80* (2018.02); *H04W 40/244* (2013.01); *H04W 76/11* (2018.02)

(58) Field of Classification Search
CPC .................................................... G06F 21/55
See application file for complete search history.

(56) References Cited

PUBLICATIONS

Fernandez, Fernando J. Maymi; 2009, University of Puerto Rico, Mayaguez Campus, pp. 53 and 75. (Year: 2009).*
Raisaro, Jean Louis et al., Addressing BEacon re-identification attacks; quantification and mitigation of privacy risks, Feb. 20, 2017; Journal of the American Medical Informatics Association; 2017; 799-805 (Year: 2017).*
Martinnez, Asier, et al; Beacon Frame Spoofing Attack Detection in IEEE 802.11 Networks; The Third International Conference on Availability, Reliability and Security; 2008; 521-525 (Year: 2008).*

(Continued)

*Primary Examiner* — Nabil H Syed
*Assistant Examiner* — Cal J Eustaquio
(74) *Attorney, Agent, or Firm* — Renner Kenner Greive Bobak Taylor & Weber (57) ABSTRACT

A system and a method for attack detection includes a constellation of beacons, wherein each beacon is adapted to broadcast a unique beacon identification code (beacon ID); a terminal device adapted to receive a user trace of beacon IDs, and send a query to a backend server or routing device to determine an occurrence of an intrusion via a network; wherein the backend server is adapted to determine an occurrence of an intrusion by carrying out the steps of: computing spatial relational metrics between beacon devices; transforming beacon IDs as states of a Markov chain model, and estimating state transition probabilities based on the spatial relational metrics; recording user traces of beacon ID transitions when terminal device make queries; and running hypothesis test on the user traces against the Markov chain model to determine a status of intrusion.

26 Claims, 9 Drawing Sheets

(56) References Cited

PUBLICATIONS

Hall, Jeyanthi; Detection of rogue devices in Wireless Networks; Ottawa-Carleton Institute for Computer Science, School of Computer Science, Carleton University, Ottawa, Ontari; 2006; 1-276. (Year: 2006).*

Huang, Rui; Probabilistic Localization of Mobile Ad Hoc Networks, Dec. 2006, The University of Texas at Arlington, pp. 1-205 (Year: 2006).*

Lv, Jiguang et al., Robust WLAN-Based Indoor Intrusion Detection Using PHY Layer Information; IEEE Access, vol. 6, Dec. 20, 2017, pp. 30117-30127 (Year: 2017).*

Chen, Yingying; Securing Wireless Localization Against Signal Strength Attacks; Oct. 2007; Rutgers, The State University of New Jersey, Graduate Program in Computer Science; pp. 1-131 (Year: 2007).*

Liu, Chenhao et al., The Detection of Physical Attacks against iBeacon Transmitter; School of Electric Engineering and Computer Science Peking University; pp. 1-10; (Year: 2016).*

Tan, Yi; Understanding Malicious and Selfish Behavior in Dynamic Spectrum Access Networks; Stevens Institute of Technology, 2012, 1-111 (Year: 2012).*

* cited by examiner

SYSTEM AND METHOD FOR ATTACK DETECTION IN WIRELESS BEACON SYSTEMS

TECHNICAL FIELD

The present invention relates to a system and methods for attack detection in wireless beacon systems, and more particularly to system and methods for attack detection in Bluetooth Low Energy (BLE) beacon systems.

BACKGROUND

Beacons are starting to be deployed to provide micro-location information to receivers, which in-turn, can be used to invoke location-based applications. For example, beacons (BLE, iBeacon, etc.) tag physical objects and locations economically, with active broadcasts to facilitate contextualized, customized content or services to be delivered to users' mobile devices. Beacon identification (ID) picked up by user devices would guide them to look up and download detailed information of the tagged object. Correct content and service delivery hinges on that beacons are deployed correctly according to a prescribed constellation mapping beacon IDs. However, the correct operation of beacon technology could be disrupted by cyber or physical threats, that is, spoofing attacks and re-shuffling attacks respectively.

Shuffling beacons leads to "wrong" spatially-specific information to user devices. Typically, beacon IDs should be available to all people to guide them to look up correct content. But this also undesirably makes the job of the attacker easier. There is no defence mechanism available to protect beacons from shuffling attack. A spoofing attack eavesdrops (lunch-time attack vs. adaptive query) all beacon IDs and plays them back at wrong locations. A more sophisticated attack could craft the beacon data before retransmission.

SUMMARY

In one aspect of the present invention there is provided a system for attack detection, comprising:
a constellation of beacons, wherein each beacon is adapted to broadcast a unique beacon identification code (beacon ID);
a terminal device adapted to receive beacon IDs, and send a query to a backend server or routing device to record and keep traces of the beacon IDs;
wherein the backend server is adapted to determine an occurrence of an intrusion by carrying out the steps of:
computing spatial relational metrics between beacon devices;
transforming beacon IDs as states of a Markov chain model, and estimating state transition probabilities based on the spatial relational metrics;
recording user traces of beacon ID transitions when terminal device makes queries;
running hypothesis test on the user traces against the Markov chain model to determine a status of intrusion.

Preferably, the step of estimating state transition probabilities comprises the steps of:
selecting a granularity resolution;
fitting Hilbert curve to the beacon constellation and computing the Hilbert value for different beacons;
defining a boundary limit B;
for each beacon $n_i$, selecting all $n_j$ with $|h(n_j)-h(n_i)| \leq B$, denoted by $S(n_i)$, and computing the sum D of $1/|h(n_i)-h(n_j)|$ for all $n_j \in S(n_i)$;
for each $n_j \in S(n_i)$, setting a transition probability $P_{ij}=1/(D|h(n_j)-h(n_i)|)$
determining if all $n_j \in S(n_i)$ with $p_{ij}$ are set, then process to next step, otherwise loop back to the setting transition probability step;
determining if all N beacons with $p_{ij}$, then halt, otherwise loop back to the computing the sum D of beacon $n_i$ step.

Preferably, the step of estimating state transition probabilities comprises the steps of:
computing a Voronoi diagram mapping for the beacon constellation;
determining a boundary value L;
for each layer of cells, assigning weight at r-th layer cells to be $a_r$;
for each beacon n, counting the number of neighbours $X_r$ in the r-th layer away, where $0 < r \leq L$;
computing the sum $S(n_i) = a_0 X_0 + a_1 X_1 + \ldots + a_L X_L$;
for each $n_j$ in the r-th layer of neighbours of $n_i z$, assigning the transition probability $$p_{ij} = \frac{a_r}{S(n_i)};$$

incrementing r;
determining if r<L then returning to the assigning the transition probability $p_{ij}$ step, otherwise proceed to next step;
halting if the transition probabilities of all n beacons are set, otherwise returning to counting the number of neighbours step.

Preferably, the step of estimating state transition probabilities comprises the steps of:
randomly wandering through the deployment of beacons;
recording the user trace of beacon ID transitions, computing the statistics of the beacon distribution and the a posterior probability distribution,
assigning a transition probability between each pair of states.

Preferably, the step of assigning a transition probability comprises a step of using the user trace of beacon IDs to estimate the transition probabilities between pairs of beacon IDs.

Preferably, the step of assigning a transition probability comprises a step of using Bayesian statistical means to estimate the transition probabilities or machine learning such as deep neural network, etc. can be used to compute the transition probabilities.

Preferably, the step of assigning a transition probability comprises a step of assigning zero the probability value if no transition exists between two states.

Preferably, the status of intrusion comprises either one of:
State $H_0$: $(c_1, c_2, \ldots, c_r, c_T)$ conforming to the baseline Markov chain model; or
State $H_1$ where intrusion or anomalous distribution.

Preferably, the hypothesis test comprises the step of:
deriving $p_{ij}(\theta)$, where $1 \leq i, j \leq N$, as the transition probability from $ID_i$ to $ID_j$ for a n-state Markov chain with $\theta$ being the corresponding set of parameters, for all possible $\theta$ by $\Omega$.

for a received user trace $C=(c_1, \ldots, c_T)$, deriving a likelihood function as the conditional probability for C to occur given θ, where $$L(\theta|c_1, \ldots, c_T) = \Pi_{t=1}^{T-1} p_{C_t, C_{t+1}}(q)$$

computing the likelihood ratio as follows:

$$\Delta = \left( \frac{L(\theta|c_1, \ldots, c_T)}{\max_{\theta' \in \Omega \setminus \{\theta\}} L(\theta'|c_1, \ldots, c_T)} \right)^{\frac{1}{T}}$$

accepting $H_0$ (with no intrusion detected) if $\Delta \geq \lambda$ where λ is the threshold.

Preferably, the value of λ is set through a Monte Carlo simulation or trial-and-error.

Preferably, the hypothesis test comprises the step of:
collecting user traces of the same length and based on a set of user traces, estimate the probability distribution P(C) of the collected traces where C is a particular user trace;
computing the reference probability distribution Q(C);
computing a Kullback-Leibler Divergence, where $$D_{KL}(P \| Q) = -\sum_C P(C) \log \frac{Q(C)}{P(C)};$$

and
accept $H_0$ if $D_{KL}(P \| Q) \leq \xi$ where ξ is a threshold.

Preferably, the value of ξ is set through a Monte Carlo simulation or trial-and-error.

In another aspect of the present invention, there is provided a method for attack detection, comprising the steps of:
computing spatial relational metrics between beacon devices at a backend server;
transforming beacon IDs as states of a Markov chain model, and estimating state transition probabilities based on the spatial relational metrics at the backend server;
receiving user traces of beacon ID transitions recorded from a terminal device;
running hypothesis test on the user traces against the Markov chain model to determine a status of intrusion at the backend server.

Preferably, the present invention provides a system and method for attack detection in wireless beacon systems, and an improvement of attack detection method in a constellation of beacons.

Preferably, the system and method for attack detection in wireless beacon systems do not require any modification of any beacon in the constellation of beacons.

In another aspect of the present invention, there is provided an intrusion detection device carrying a method comprising the steps of:
computing a Markov chain based probability distribution for acceptable traces of beacon IDs reported from the terminal device as it queries for location based services or content;
verifying through a hypothesis test to determine whether the received trace of beacon IDs is outside an acceptable value range of the Markov chain based probability distribution.
in the event that a trace of beacon IDs is outside the acceptable value range, generating a signal indicating that an intrusion occurs.

Preferably, the Markov chain based probability distribution is predetermined through Hilbert value, VORONOI diagram or field test with Bayesian statistics or machine learning through DNN.

Other advantages will become apparent when taken into consideration with the following specification and drawings.

The embodiments of the present invention also overcome or ameliorate at least one of the disadvantages of the prior art, or to provide a useful alternative.

BRIEF DESCRIPTION OF THE DRAWINGS

Features and advantages of the present invention will become apparent from the following description of embodiments thereof, by way of example only, with reference to the accompanying drawings, in which.

DESCRIPTION OF THE INVENTION

The inventors have, through their own research, devised that, for beacons security, computational constraints may be a main impediment to implementing effective defence.

In one example, there is a data protection method for iBeacon base station. The data protection method comprising: modifying the iBeacon base station identification information after a controlling device has established a communication connection with the iBeacon base station, and uploading the modified iBeacon base station identification information to a server; updating by the server a mapping table of locations and identification information of iBeacon base stations according to the modified iBeacon base station identification information.

In another example, a Low energy Bluetooth system with authentication during connectionless advertising and broadcasting may be used. The authenticated data is generated using said authenticated information. An advertisement string is broadcast from the BLE device in a connectionless session along with said validation data.

Alternatively, an iBeacon based data encryption method and system may be adopted. The iBeacon base station generates and sends changed UUID (Universally Unique Identifier) information at a fixed time interval, wherein the UUID information is encrypted; the end user devices determine whether received UUID belongs to one of the UUID information or not; and after the user device determines that the received UUID belongs to one of the UUID information, the user device decrypts the UUID information, and the UUID information is accessed into a network.

In one example embodiment, the method may use pseudonyms to protect privacy and anonymity of communication messages. In this example, a pseudonym is extracted from a received message for comparison against a precomputed set of pseudonyms associated respectively with a plurality of communities of wireless nodes. The pseudonyms are valid only for a particular time period.

In an alternative method, after an event, the apparatus may create a wireless message based on the event and then send the wireless message to a peripheral apparatus. The peripheral apparatus utilizes some or all of the message data to formulate and display a user interface. Inputs (e.g., soft-coded or hardware based buttons) in the peripheral device are actuated in accordance with the user interface, which results in a response message being sent to the apparatus. The response message, in turn, trigger functionality in the apparatus.

Without wishing to be bound by theory, the use of dynamic beacon identification (ID) which changes with time, such that collected identifications (through lunch-time attacks) may not be useful later one. Hence, modifications on beacons are necessary. Besides, this method might not withhold adequate query attacks which eavesdrop and immediately forward to the spoofing beacons to play back.

For example, a secure beacon-based beacon may be used to generate dynamic beacon identifiers. A mobile device application may send a request to an application server, including a dynamic beacon identifier. The application server can locally compute the dynamic beacon identifier and compare it to the received beacon identifier to validate the request and determine whether to respond to the request.

Alternatively, beacon signals may be received from a beacon device, such as a mobile device or a server, that identifies a beacon authentication value from the beacon signal. The beacon device calculates a local verification value from a security algorithm. A comparison of the authentication value to the local verification value is performed, and a location service is provided based on the comparison.

These examples may provide a baseline model of normal behavior regarding the transactions of beacon IDs, and hence detect outlier behavior attributed to spoofing and re-shuffling attacks, as well as, other causes.

In another example embodiment, there is provided a system of detection of spoof attacks on the Internet of Things (IoT) location broadcasting by a stream of beacons. The stream of beacons comprising at least a unique source identifier is generated. A list of broadcasted beacons is stored in a table along with a time and location of broadcast. Subsequent to broadcasting, a stream of beacons is detected. The detected beacon stream comprises a unique source identifier along with a time and a location of a broadcast. The unique source identifier, the time and the location of at least one beacon of the detected beacon stream can be compared to the unique source identifier, the time and the location of at least one beacon of the broadcast beacon stream. Responsive to a match between the unique source identifiers and a mismatch of at least one of the times and locations, it is determined that the broadcast beacon stream has been spoofed by the detected beacon stream. Once a spoof has been detected, various remediation actions can be taken, such as sending alerts to admin, cautioning end users, and other security mode procedures.

Some other systems may detect poisoning attacks of the Internet of Things (IoT) location beacons in wireless local area networks (WLANs) with silence periods. The silence periods are associated with the location beacons and are unknown to the public. The location beacon transmission time is compared to the silence periods. Responsive to the location beacon transmission time corresponding to at least one of the silence periods, the location device flagged as poisoned.

Aiming at defence against adaptive query attacks, new wireless networking devices may be installed in proximity of fake beacon devices to transmit dummy beacons and detect play-back from them with a wrong timestamp to infer the existence of an attack.

Alternatively, using secret silent periods in legitimate beacons may detect poisoning attacks. To implement these systems, there is a need of installing a new device in proximity of fake beacon devices to pick up spoofing beacons, while all detection is done in the backend server seamlessly to users.

It may be more preferable to provide an attack detection method such that minimum or ideally no workload needs to be imposed on beacon devices while achieving detection of wrong beacon ID constellation attributed to spoofing attacks, re-shuffling attacks or others. The majority of overhead should be on the mobile devices or the backend servers.

Some of the abovementioned examples may only defend against spoofing attack. Alternatively, some preferably embodiments of the present invention may work for both spoofing and re-shuffling attacks.

Preferably, the attack detection method requires no modification on beacon devices (neither hardware nor firmware) is necessary. That is, standard beacon IDs could still be broadcast to all people (including the attacker) in the typical way. Passive detection should be used such that there is no need to install additional devices.

In an embodiment of the present invention, a method to form the baseline, Markov chain model of device identity transition probabilities for active (such as beacons) and passive (RFID tags) IoT devices to "passively" detect both spoofing and re-shuffling attacks, and others. The active (such as beacons) and passive (RFID tags) IoT devices form a constellation of beacons.

In one implementation of an embodiment of the present invention, there is provided a backend server or a routing device receiving queries from a terminal device such as a smartphone, tablet, routing device, or other mobile devices, and detecting an intrusion, such as spoofing and re-shuffling attacks has taken place.

The backend server or routing device is adapted to form a Markov chain with states being beacon device identities, and calculate the transition probability between each pair of Markov chain states from the given constellation of device deployment.

The terminal device will send a series of beacon IDs to the backend server or routing device. The backend server records traces of beacon IDs sent from various terminal devices. Whenever a terminal device receives a beacon ID, it will forward it to the backend server in the usual scenarios to query content or services based on the beacon ID. Over time, the backend server records/stores up the sequence of transitions of IDs picked up by a particular terminal device. This sequence of transitions forms a trace. The backend server then runs hypothesis testing on the trace against the predetermined Markov chain transition probabilities.

Once the backend server or routing device receives the beacon ID transitions from requests of terminal devices, it will run a hypothesis test to decide if a given user trace is an outlier with respect to the baseline model. If it is found that the user trace is an outlier with respect to the baseline model, the backend server will flag out a possible intrusion to the system administrator.

Figure 1:
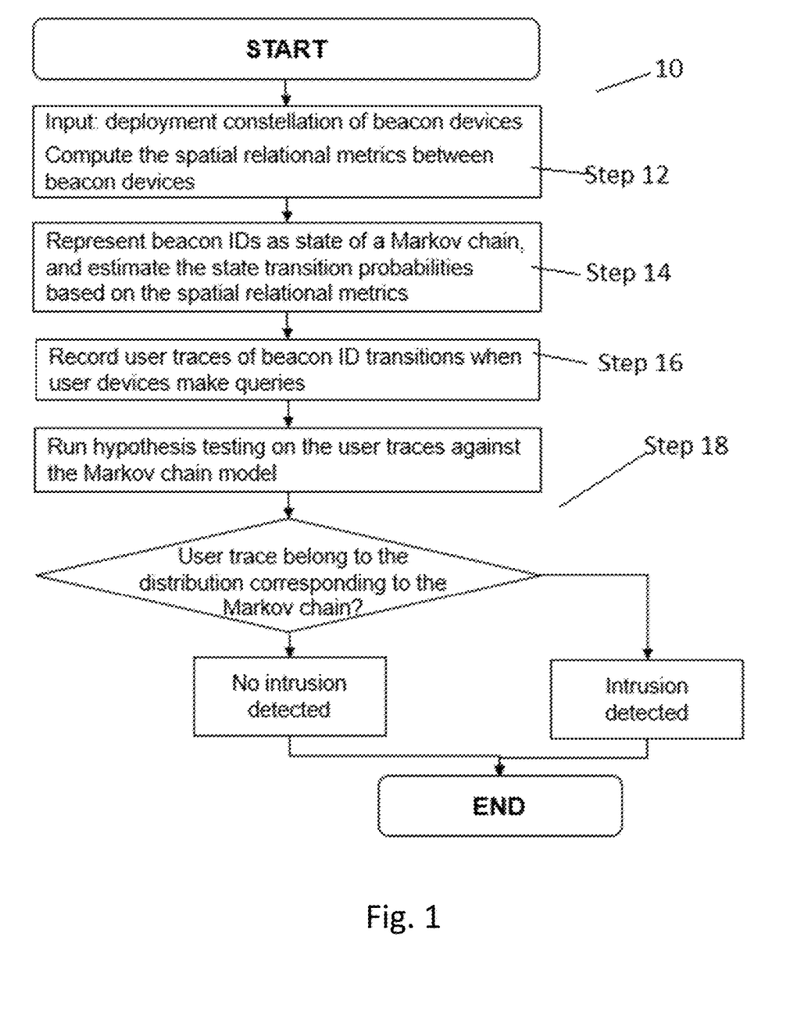
FIG. 1 shows a schematic diagram of a method for attack detection in wireless beacon systems according to an embodiment of the present invention.

FIG. 1 shows a schematic diagram of a method 10 of detecting for attack detection in a constellation of beacon devices. The method 10 comprises the steps of:
computing spatial relational metrics between beacon devices as shown in Step 12;
transforming beacon IDs as states of a Markov chain model, and estimating state transition probabilities based on the spatial relational metrics to form the baseline model as shown in Step 14;
recording user traces of beacon ID transitions when terminal devices make queries as shown in Step 16;
running hypothesis test on the user traces against the Markov chain model (baseline model) to determine a status of intrusion as shown in Step 18.

Figure 2:
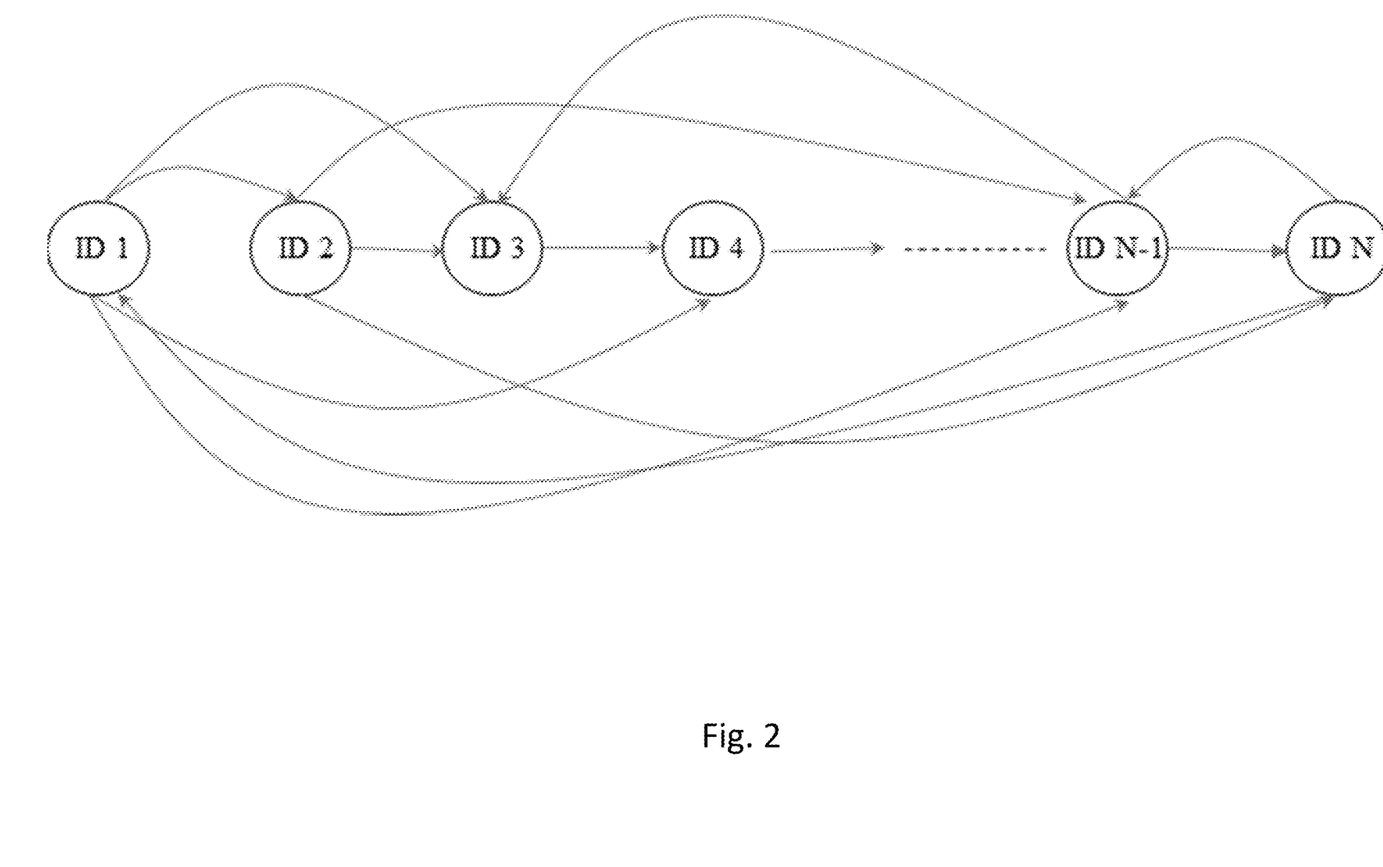
FIG. 2 shows a schematic diagram of a Markov chain model generated by the method shown in FIG. 1.

The principle of an embodiment of the present invention utilises the statistical property of the user trace in a Markov chain model generated by beacon IDs as states and the corresponding state transition probabilities. Each beacon ID represents a state. The transition probability $p_{ij}$ from the beacon $ID_i$ to beacon $ID_j$ can then be derived as shown in FIG. 2. The present invention presents a number of different methods to calculate the state transition probabilities.

In one embodiment, the transition probability is calculated with Hilbert Transform algorithm. The Hilbert Transformation algorithm is a space fitting curve algorithm that uses ordered Hilbert values of beacons to find nearest neighbors, and assign transition probabilities based on the order. The algorithm transforms the two-dimensional coordinate of a planar constellation of beacon devices into a linear arrangement of device identities with weights in Hilbert values. Then the weights (based on the selected maximum no. of hops of neighbours) are normalized into transition probabilities such that all the conditional probabilities are summed up to 1 for any state.

The spatial constellation of beacons in the 2-D space is transformed into a linear ordering of beacon IDs with Hilbert value $h(n_i)$ where $n_i$ is the beacon ID. The closeness of two beacons $n_i$, $n_j$ can be estimated by:

$$D_{ij}=|h(n_i)-h(b_j)|$$

By choosing a bound B, the nearest neighbours of a beacon device $n_i$ are then the set $S(n_i)=\{n_j:|h(n_j)-h(n_i)|\leq B\}$. The transition probabilities from $ID_i$ to $ID_j$ can be estimated as:

$$p_{ij} = \begin{cases} \dfrac{\frac{1}{D_{ij}}}{\sum_{n_j \in S(n_i)} \frac{1}{D_{ij}}}, & n_j \in S(n_i) \\ 0, & \text{elsewhere} \end{cases}$$

Figure 3:
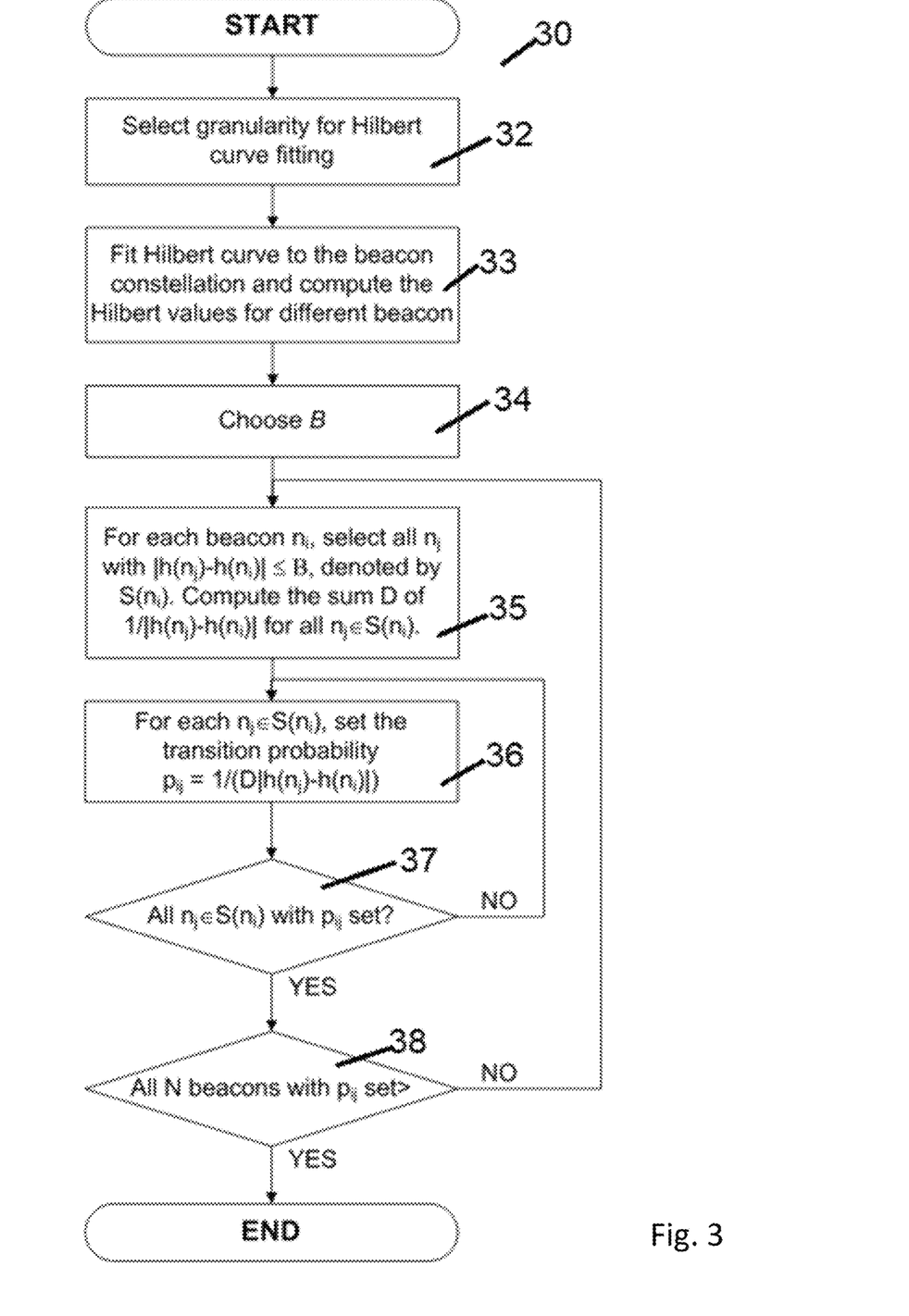
FIG. 3 shows a schematic diagram of a method for generating state transition probabilities for the Markov chain model shown in FIG. 2.

The process 30 of the Hilbert Space Fitting Curve of an embodiment of the present invention is shown in FIG. 2 and FIG. 3. The process 30 comprises the steps of:
selecting a granularity resolution in Step 32;
fitting Hilbert curve to the beacon constellation and computing the Hilbert value for different beacons in Step 33;
defining a boundary limit B in Step 34;
for each beacon $n_i$, selecting all $n_j$ with $|h(n_j)-h(n_i)|B$, denoted by $S(n_i)$, and computing the sum D of $1/|h(n_i)-h(n_j)|$ for all $n_j \in S(n_i)$ in Step 35;
in Step 36, for each $n_j \in S(n_i)$, set a transition probability $P_{ij}=1|h(n_i)-h(n_i)|)$,
if all $n_j \in S(n_i)$ with $p_{ij}$ are set in Step 36, then process to Step 37, otherwise loop back to Step 36;
if all N beacons with $p_{ij}$ in Step 37, then halt, otherwise loop back to Step 35.

Figure 4:
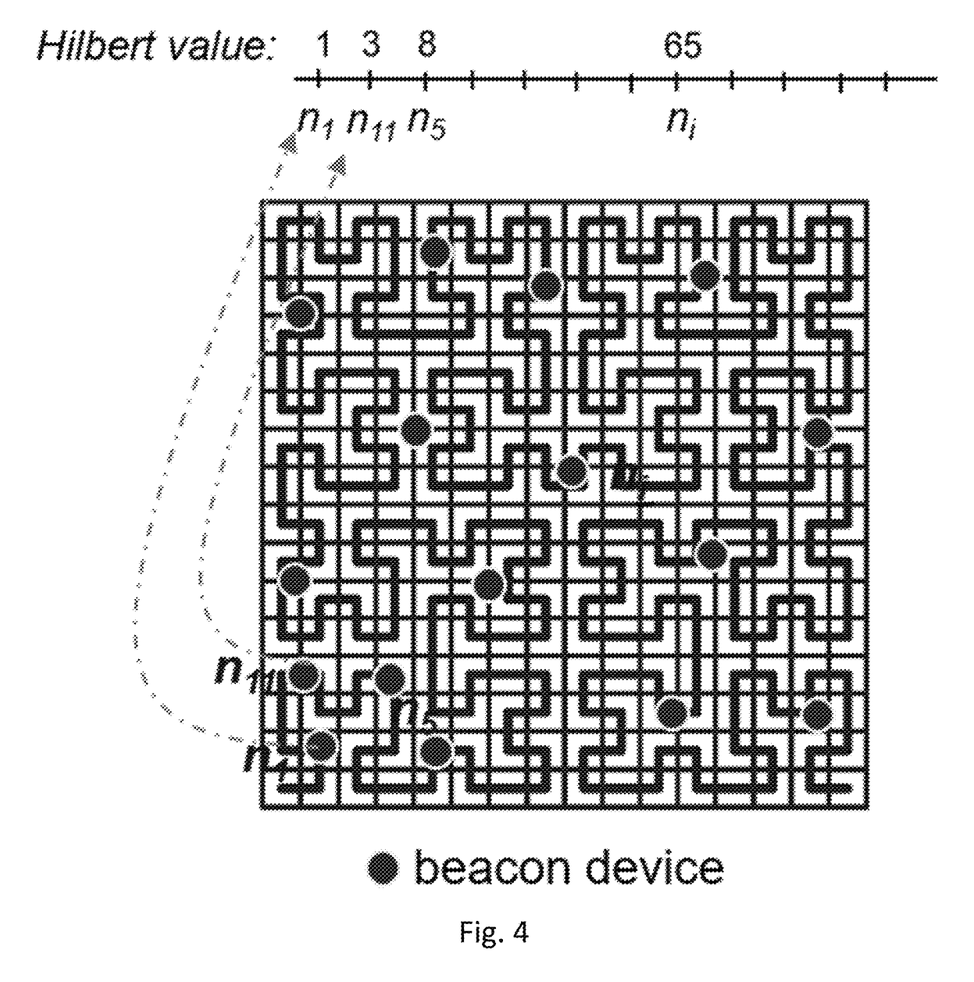
FIG. 4 shows a schematic diagram of a graphical representation of the method shown in FIG. 3.
Figure 5:
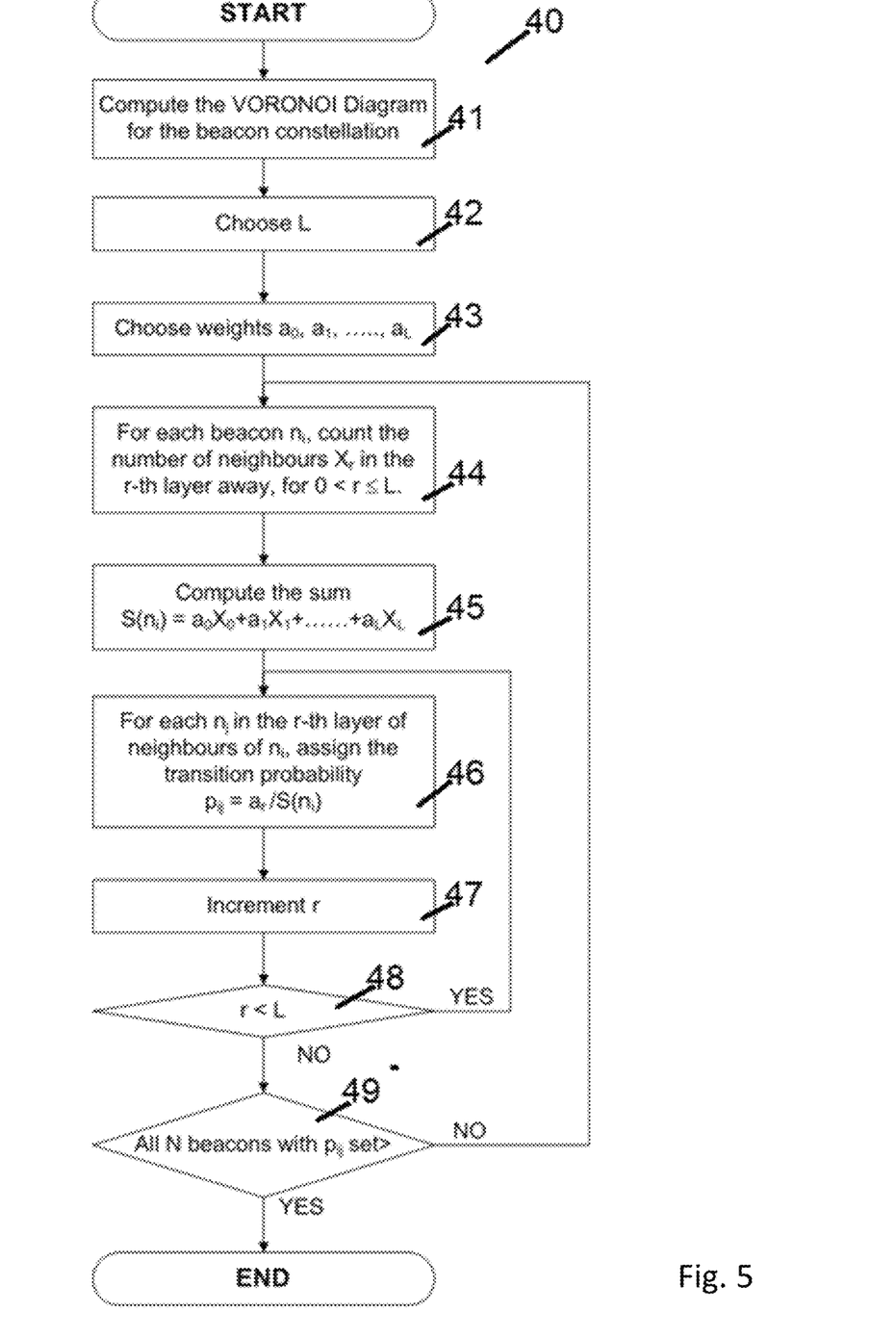
FIG. 5 shows a schematic diagram of another method for generating state transition probabilities for the Markov chain model shown in FIG. 2.
Figure 6:
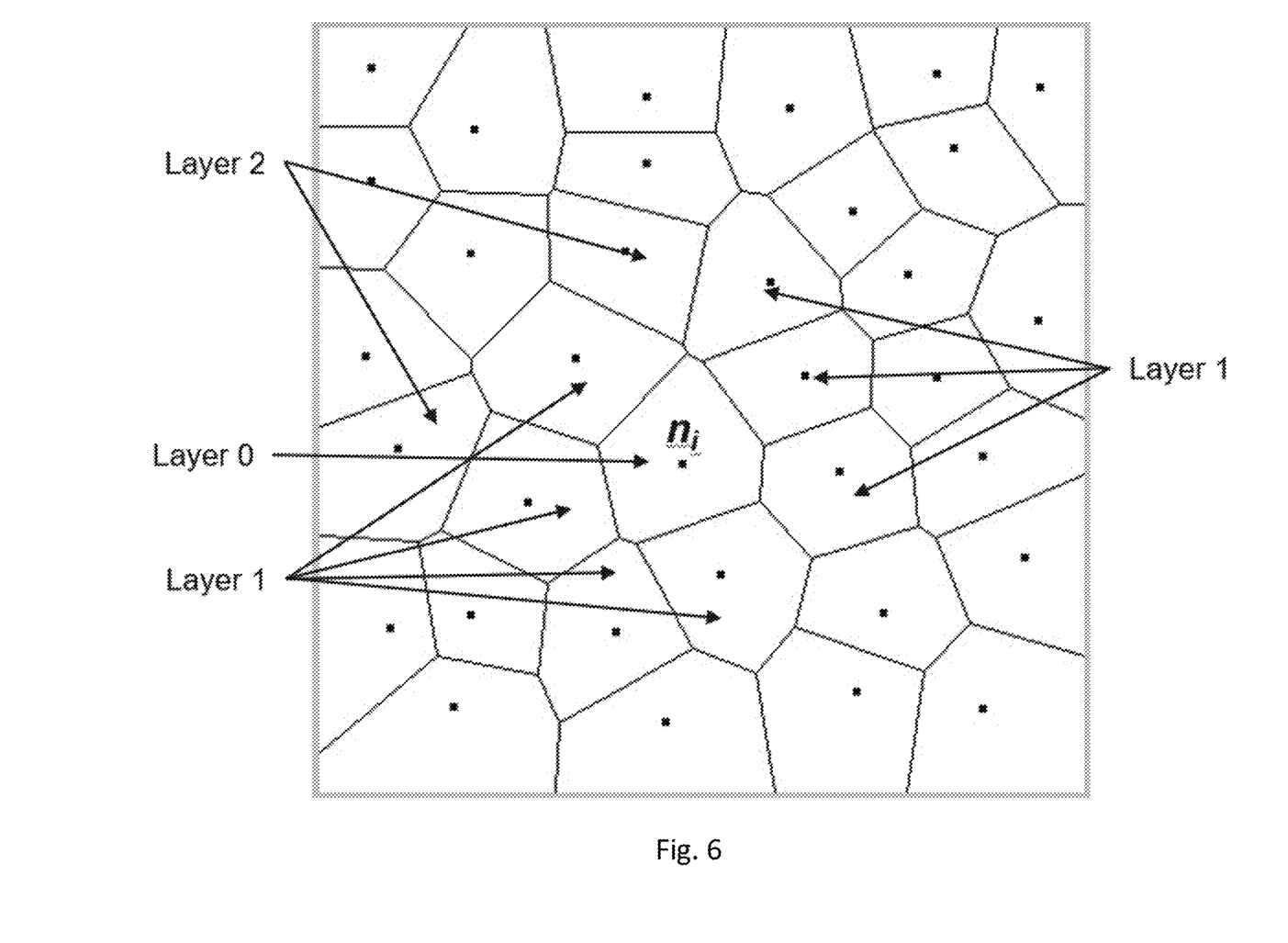
FIG. 6 shows a schematic diagram of a graphical representation of the method shown in FIG. 5.

Alternatively, an embodiment of the present invention uses Voronoi diagram mapping in order to generate the transition probability. The Voronoi diagram mapping method comprises the step of partitioning a two dimensional space into cells. For any beacon $n_i$, the system assigns different weights to other beacons based on how far the Voronoi cells these beacons belong to from the cell with $n_i$. Nearer cells are assigned with a higher weight. The system then assigns the weight at the r-th layer cells to be $a_r$. That is, $a_0 > a_1 > \ldots$ The system then assigns a maximum bound L on the layers to be included in setting the transition probabilities, beyond which the transition probability is zero. Assign the transition probability $p_{ij}$ such that
a. the ratio of $p_{ij}:P_{ij'}=a_x:a_y$ if $n_j$ and $n_{j'}$ belong to cells at layer x and layer y respectively, and
b. sum of all $p_{ij}=1$ for any $n_i$ The process 40 of the Voronoi diagram mapping of an embodiment of the present invention is shown in FIG. 4 and FIG. 5. The process 40 comprises the steps of:
computing a Voronoi diagram mapping for the beacon constellation in Step 41;
determining a boundary value L in Step 42;
for each layer of cells, assigning weight at r-th layer cells to be $a_r$ in Step 43;
for each beacon n, counting the number of neighbours $X_r$ in the r-th layer away, where $0 < r \leq L$ in Step 44;
computing the sum $S(n_i)=a_0X_0+a_1X_1+ \ldots +a_LX_L$ in Step 45;
for each $n_j$ in the r-th layer of neighbours of $n_i$, assigning the transition probability $p_{ij}=a_r/S(n_i)$ in Step 46; incrementing r in Step 47;
in Step 48, checking if r<L, then returning to Step 46, otherwise proceed to Step 49;
in Step 49, halt if the transition probabilities of all n beacons are set, otherwise returning to Step 44.

In another embodiment of the present invention, the transition probabilities between the beacons is derived with an empirical method which comprises the step of
randomly wandering through the deployment of beacons (pre-launch or after-launch);
recording the trace of beacon ID transitions, compute the statistics of the beacon distribution and the a posterior probability distribution,
assigning a transition probability between each pair of states.

In the step of assigning a transition probability, the system may use the trace to estimate the transition probabilities between pairs of beacon IDs. Alternatively, the system may use Bayesian statistical means or any machine learning algorithm to estimate the transition probabilities. If no transition between two states, zero or a very small probability value can be assigned.

Figure 7:
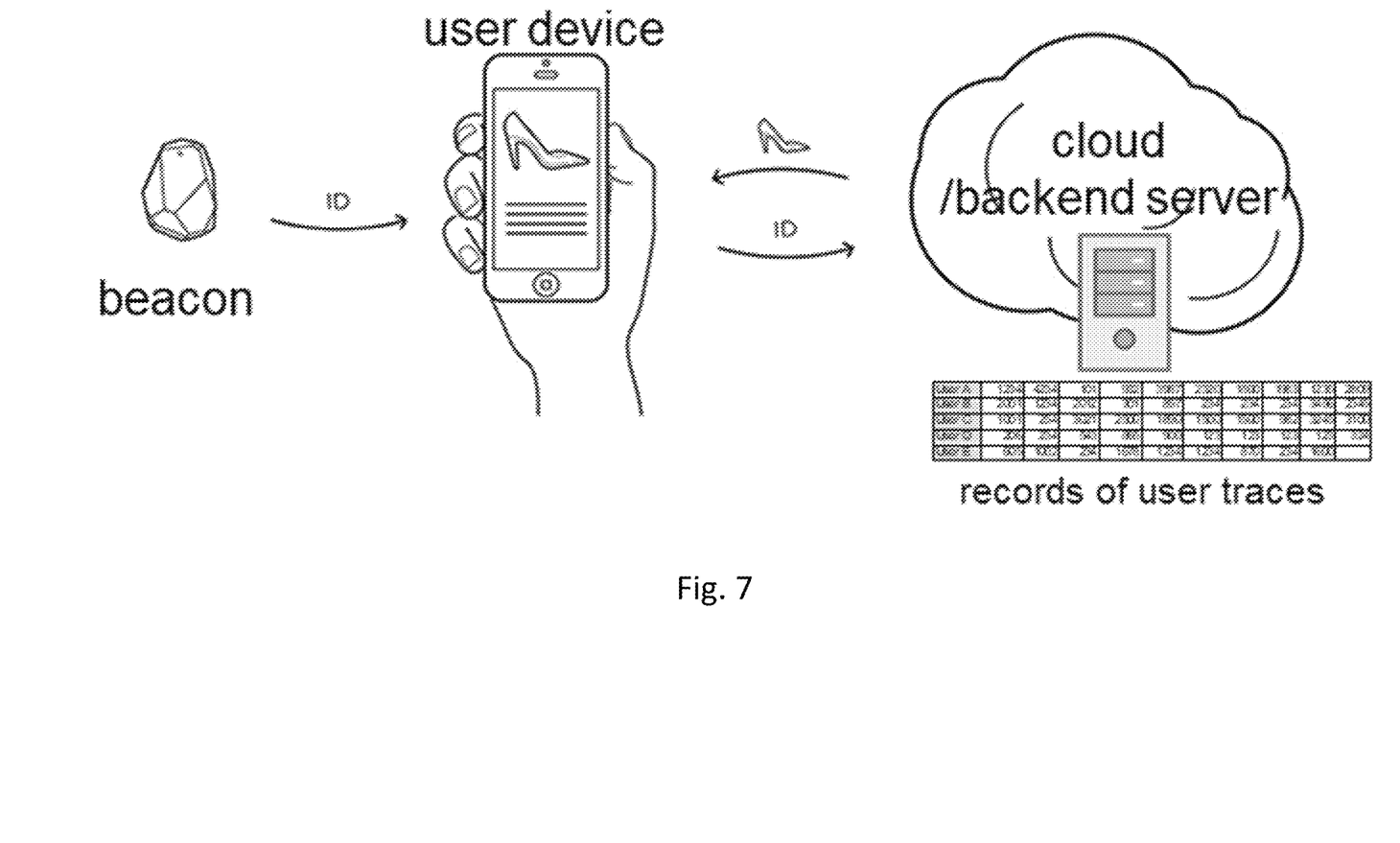
FIG. 7 shows a system for attack detection in wireless beacon systems according to an embodiment of the present invention.

In one embodiment of the present invention as shown in FIG. 7, a terminal device picks up broadcast beacon IDs and use them as keys to query a backend server or a routing device for location-based information or services. The backend server (which could be in the cloud) or routing device can, therefore, record a user trace of the terminal device which is a temporal sequence of beacon IDs recorded by the terminal device.

A user trace can be viewed as a discrete random process parameterized by the underlying Markov chain. First, the baseline model represents one probability distribution. Second, user traces could form another probability distribution. If there is no intrusion, the two distributions should resemble each other probabilistically. If the user trace distribution deviates significantly and forms an outlier, we can conclude that it is significantly different from the baseline model, and an intrusion probably has occurred.

An outlier of user traces probability distribution likely indicates an intrusion has taken place. Altering the parameters of the underlying Markov chain model or base model can adjust the accuracy of the intrusion detection system. In one embodiment, the backend server or routing device will use the user trace to determine whether it belongs to the distribution corresponding to the Markov chain model or base model at the time when the terminal device makes a query to the backend server or routing device.

The randomness of beacon ID transitions depends largely on user mobility pattern in most cases. The underlying probability distribution of beacon ID transitions is therefore relatively time-invariant or slowly varying. The Markov chain model could be of a lower order as well. Therefore, based on the Markov chain model, it is possible to test if an observed user trace belongs to the corresponding distribution of the Markov chain. If not, it can be assumed an intrusion has likely happened.

In one embodiment of the present invention, a user trace with T IDs is recorded and encoded by a backend server as:
(c1, $c_2$, . . . , $c_r$, . . . , $c_T$)

This user trace will be recorded a backend server or routing device as the terminal device send a query to the backend server or routing device. The backend server or routing device then runs a hypothesis test to determine whether the received user trace conforms to the distribution as derived by the Markov chain model process. The testing process will generate either one of two opposing hypotheses, which are:

$H_0$: ($c_1$, $c_2$, . . . , $c_r$, . . . , $c_T$) conforming to the baseline Markov chain model; or $H_1$: intrusion or anomalous distribution There are many different hypothesis tests that can be implemented in an embodiment of the present invention. For example, the backend server or routing device may carry out a Generalized Likelihood Ratio Test (GLRT) or Kullback-Leibler Divergence (KLD) to test the hypotheses.

In one embodiment of the present invention, the hypothesis test in Step 18 comprises a method of Generalized Likelihood Ratio Test (GLRT), wherein the GLRT comprises the steps of:

deriving $p_{ij}(\theta)$, where $1 \leq i, j \leq N$, as the transition probability from $ID_i$ to $ID_j$ for a n-state Markov chain with $\theta$ being the corresponding set of parameters, for all possible $\theta$ by $\Omega$.

for a received user trace $C=(c_1, \ldots, c_T)$, deriving a likelihood function as the conditional probability for C to occur given $\theta$, where $$L(\theta|c_1, \ldots, c_T) = \prod_{r=1}^{T-1} p_{c_r, c_{r+1}}(q)$$

computing the likelihood ratio as follows:

$$\Delta = \left(\frac{L(\theta|c_1, \ldots, c_T)}{\max_{\theta' \in \Omega \setminus \{\theta\}} L(\theta'|c_1, \ldots, c_T)}\right)^{\frac{1}{T}}$$

accepting $H_0$ (with no intrusion detected) if $\Delta \geq \lambda$ where $\lambda$ is the threshold.

The values of $p_{ij}(\theta)$ are derived by one of the three (3) methods described previously, including Hilbert transform, VORONOI diagram and field trial plus Bayesian statistics or machine learning algorithms.

In one embodiment, the value of $\lambda$ is set through a Monte Carlo simulation or trial-and-error. The value of $\lambda$ can be adjusted by the backend server or routing device after the backend server or routing device received feedbacks from the terminal devices according to a number of false positives and false negatives received.

In general, $$\Delta \geq L(\theta|c_1, \ldots, c_T)^{\frac{1}{T}}.$$

In one embodiment, the backend server or routing device accepts $H_0$ if $$L(\theta|c_1, \ldots, c_T)^{\frac{1}{T}} \geq \lambda$$

since this implies $\Delta \geq \lambda$. This will reduce the number of calculation process and speed up the testing process.

In another embodiment of the present invention, the hypothesis test in Step 18 comprises a method of Kullback-Leibler Divergence (KLD), wherein the KLD comprises the steps of:

collecting user traces of the same length and based on a set of user traces, estimate the probability distribution P(C) of the collected traces where C is a particular user trace;

computing the reference probability distribution Q(C);

computing a KLD, where $$D_{KL}(P\|Q) = -\sum_{C} P(C) \log \frac{Q(C)}{P(C)}$$

Accept $H_0$ if $D_{KL}(P\|Q) \leq \xi$ where $\xi$ is a threshold.

In one embodiment, the value of $\xi$ is set through a Monte Carlo simulation or trial-and-error. In another embodiment, the value of $\xi$ is set empirically. The value of $\xi$ can be adjusted by the backend server or routing device after the backend server or routing device received feedbacks from the terminal devices according to a number of false positives and false negatives received.

In one embodiment, the step of collecting user traces comprises the step of setting a moving window over all user traces, such that C at a particular time is all user traces in the window.

Figure 8:
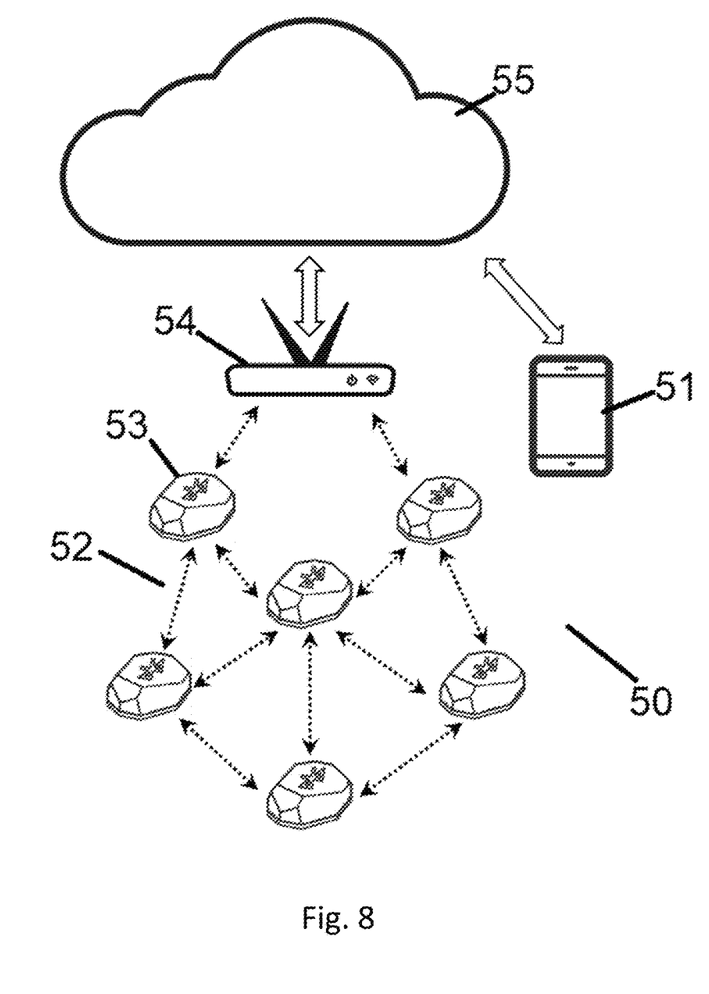
FIG. 8 shows another system for attack detection in wireless beacon systems according to an embodiment of the present invention.

In one embodiment of the present invention as shown in FIG. 8, there is provided a system 50 for attack detection in wireless beacon systems, comprising a constellation 52 of beacons, wherein each beacon 53 is adapted to broadcast a unique beacon identification code (beacon ID). The system 50 also has a terminal device 51 adapted to receive a user trace of beacon IDs, and send a query to a backend server 54 or routing device to determine an occurrence of an intrusion via a network 55. The backend server 54 is adapted to determine an occurrence of an intrusion by carrying out the steps of computing spatial relational metrics between beacon devices as shown in Step 12. Then the backend server 54 transforms beacon IDs as states of a Markov chain model, and estimating state transition probabilities based on the spatial relational metrics as shown in Step 14. The backend server 64 will then record user traces of beacon ID transitions when terminal device 51 make queries as shown in Step 16; and run hypothesis test on the user traces against the Markov chain model to determine a status of intrusion as shown in Step 18.

Figure 9:
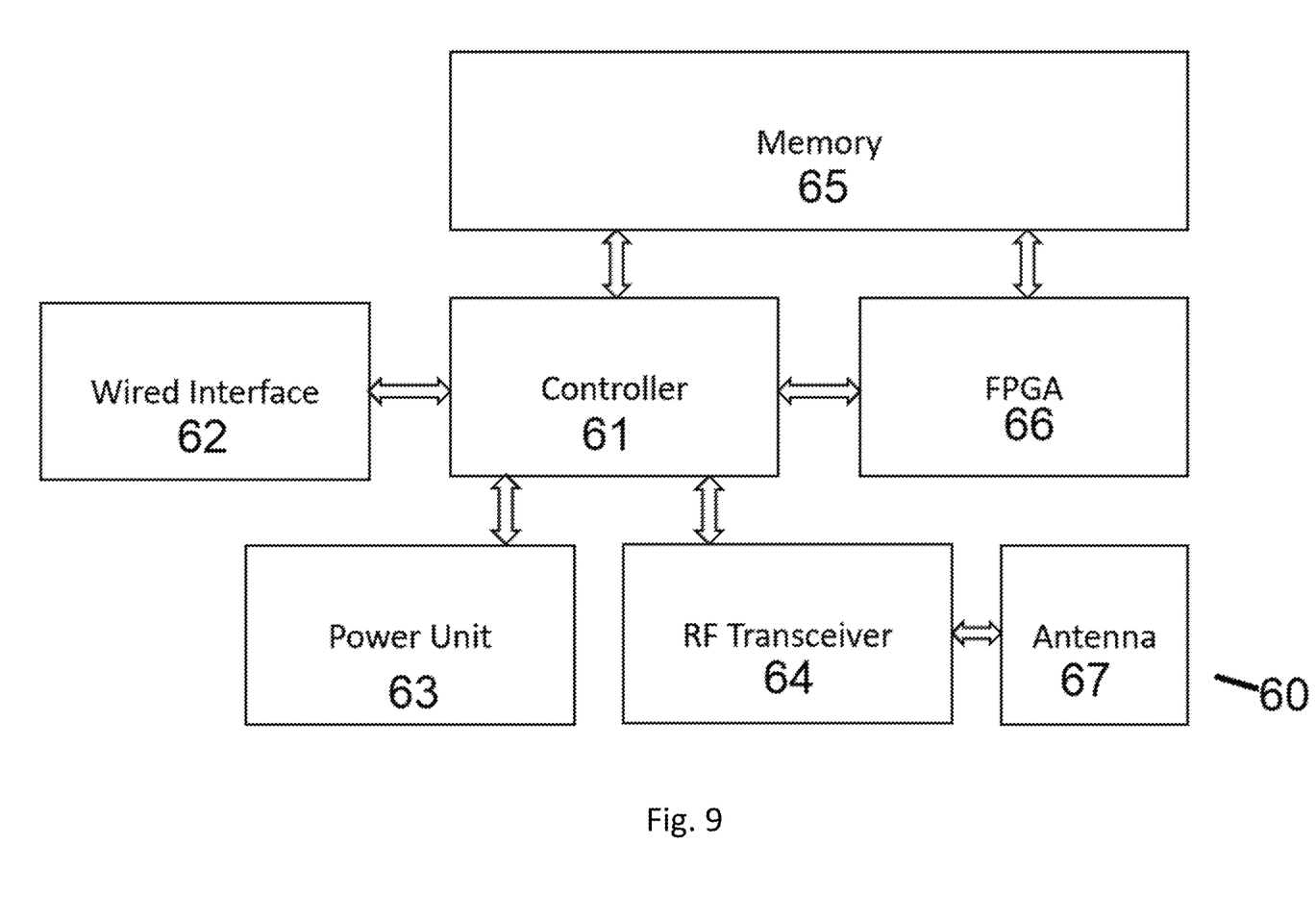
FIG. 9 shows another terminal device for attack detection in wireless beacon systems according to an embodiment of the present invention.

In one aspect of the present invention as shown in FIG. 9, there is provided a terminal device 60 which comprises a controller 61 for controlling the radio signals through a radio frequency (RF) transceiver 64, wherein the RF transceiver is connected to an antenna 67. The terminal device 60 also has a field-programmable gate array (FPGA) for encoding the radio signals to beacon IDs, and a memory module 65 for storing a user trace of beacon IDs. The controller 61 is adapted to forward the user trace of beacon IDs for detecting an occurrence of instruction by subjected the user trace to a hypothesis test against a Markov chain model to determine a status of intrusion as shown in Step 18. The Markov chain model is generated by computing at a backend server or routing device spatial relational metrics between beacon devices as shown in Step 12, and transforming beacon IDs as states of a Markov chain model, and estimating state transition probabilities based on the spatial relational metrics as shown in Step 14.

Advantageously, the embodiments of the present invention are based on a completely passive detection method with the baseline formed wholly based on passively observing user traces or computed offline and does not require additional equipment to inject beacons and detect spoofed beacons.

The embodiments of the present invention may be advantageous over methods of injecting time-varying dummy beacons in the proximity of the suspected fake beacon devices to form a baseline model and assumes these fake beacon devices to pick up the dummy beacons and replay them with a different timestamp.

Further, the method of injecting time-varying dummy beacons would still be vulnerable to re-shuffling attacks which do not involve beacon signal playbacks.

The present invention works well for both spoofing and re-shuffling attacks, as both will cause a deviation of transition probabilities from the baseline case.

Advantageously, the method of the present invention does not require a new detector equipment to be placed near the suspected fake beacon devices.

The present invention has all the detection will be done in the backend server or router with the previously formed baseline models and beacon ID traces extracted from user requests in normal operation of the beacon system.

Advantageously, the method of the present invention does not require a dedicated device to pick up beacon signals to verify whether an intrusion has occurred.

The present invention only uses recorded traces from usual queries from users to run a hypothesis test to verify possible intrusion.

It is understood that those skilled in the art will realize that variations may be made in the core teachings of this invention.

It will also be appreciated that where the methods and systems of the present invention are either wholly implemented by computing system or partly implemented by computing systems then any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated. Although the invention has been described with reference to specific examples, it will be appreciated by those skilled in the art that the invention may be embodied in many other forms, in keeping with the broad principles and the spirit of the invention described herein.

The invention claimed is:

1. A system for attack detection for a constellation of beacons, wherein each beacon is adapted to broadcast a unique beacon identification code (beacon ID), comprising
   a backend server or routing device, adapted to record a user trace of beacon IDs from queries sent by terminal devices, to determine an occurrence of an intrusion via a network;
      wherein the backend server is adapted to determine an occurrence of an intrusion by carrying out the steps of:
      computing spatial relational metrics between beacon devices;
      transforming beacon IDs as states of a Markov chain model, and estimating state transition probabilities based on the spatial relational metrics;
      recording user traces of beacon ID transitions when terminal device makes queries for location- or item-based content or services; and
      running hypothesis test on the user traces against the Markov chain model to determine a status of intrusion.

2. The system of claim 1, wherein the step of estimating state transition probabilities comprises the steps of:
   selecting a granularity resolution;
   fitting Hilbert curve to the beacon constellation and computing the Hilbert value for different beacons;
   defining a boundary limit B;
   for each beacon $n_i$, selecting all $n_j$ with $|h(n_j)-h(n_i)| \leq B$, denoted by $S(n_i)$, and computing the sum D of $1/|h(n_i)-h(n_j)|$ for all $n_j \in S(n_i)$;
   for each $n_j \in S(n_i)$, setting a transition probability $P_{ij}=1/(D|h(n_j)-h(n_i)|)$,
   determining if all $n_j \in S(n_i)$ with $p_{ij}$ are set, then process to next step, otherwise loop back to the setting transition probability step; and
   determining if all N beacons with $p_{ij}$, then halt, otherwise loop back to the computing the sum D of beacon $n_i$ step.

3. The system of claim 1, wherein the step of estimating state transition probabilities comprises the steps of:
   computing a Voronoi diagram mapping for the beacon constellation;
   determining a boundary value L;
   for each layer of cells, assigning weight at r-th layer cells to be $a_r$;
   for each beacon n, counting the number of neighbours $X_r$ in the r-th layer away, where $0 < r \leq L$;
   computing the sum $S(n_i)=a_0X_0+a_1X_1+\ldots+a_LX_L$;
   for each $n_j$ in the r-th layer of neighbours of ni, assigning the transition probability $$p_{ij} = \frac{a_r}{S(n_i)};$$

incrementing r;

determining if r<L then returning to the assigning the transition probability $p_{ij}$ step, otherwise proceed to next step; and halting if the transition probabilities of all n beacons are set, otherwise returning to counting the number of neighbours step.

4. The system of claim 1, wherein the step of estimating state transition probabilities comprises the steps of:

randomly wandering through the deployment of beacons;

recording the user trace of beacon ID transitions, compute the statistics of the beacon distribution and the a posterior probability distribution; and assigning a transition probability between each pair of states.

5. The system of claim 4, wherein the step of assigning a transition probability comprises a step of using the user trace of beacon IDs are used to estimate the transition probabilities between pairs of beacon IDs.

6. The system of claim 4, wherein the step of assigning a transition probability comprises a step of using Bayesian statistical means to estimate the transition probabilities or machine learning such as deep neural network, etc. can be used to compute the transition probabilities.

7. The system of claim 4, wherein the step of assigning a transition probability comprises a step of assigning zero the probability value if no transition exists between two states.

8. The system of claim 1, wherein the status of intrusion comprises either one of:

State H0: (clr c2, . . . , crr . . . , cT) being accepted trace distribution which fit to the Markov chain model where no intrusion is detected; or State Hx where intrusion or anomalous distribution of traces.

9. The system of claim 8, wherein the hypothesis test comprises the step of:

deriving p±j(0), where 1 i i, j<N, as the transition probability from ID± to IDj for a n-state Markov chain with 0 being the corresponding set of parameters, for all possible θ by Ω for a received user trace C=(clr . . . , cT), deriving a likelihood function as the conditional probability for C to occur given 0, where L(6I c±, . . . , Ct)-rir=I Pcrcr+107)

computing the likelihood ratio as follows:

$$\Delta = \left( \frac{L(\theta | c_1, \ldots, c_T)}{\max_{\theta' \in \Omega \setminus \{\theta\}} L(\theta' | c_1, \ldots, c_T)} \right)^{\frac{1}{T}};$$

and accepting H0 (with no intrusion detected) if A>A where X is the threshold.

10. The system of claim 9, wherein the value of λ is set through a Monte Carlo simulation or trial-and-error.

11. The system of claim 8, wherein the hypothesis test comprises the step of:

collecting user traces of the same length and based on a set of user traces, estimate the probability distribution P(C) of the collected traces where C is a particular user trace;

computing the reference probability distribution Q(C);

computing a KLD, where $$D_{KL}(P\|Q) = -\sum_C P(C) \log \frac{Q(C)}{P(C)};$$

and accept $H_0$ if $D_{KL}(P\|Q) \leq \xi$ where $\xi$ is a threshold.

12. The system of claim 11, wherein the value of $\xi$ is set through a Monte Carlo simulation or trial-and-error.

13. A method for attack detection, comprising the steps of:

computing spatial relational metrics between beacon devices at a backend server;

transforming beacon IDs as states of a Markov chain model, and estimating state transition probabilities based on the spatial relational metrics at the backend server;

receiving user traces of beacon ID transitions recorded from a terminal device; and running hypothesis test on the user traces against the Markov chain model to determine a status of intrusion at the backend server.

14. The method of claim 13, wherein the step of estimating state transition probabilities comprises the steps of:

selecting a granularity resolution;

fitting Hilbert curve to the beacon constellation and computing the Hilbert value for different beacons;

defining a boundary limit B;

for each beacon $n_i$, selecting all $n_j$ with $|h(n_j)-h(n_i)| \leq B$, denoted by $S(n_i)$, and computing the sum D of $1/|h(n_i)-h(n_j)|$ for all $n_j \in S(n_i)$;

for each $n_j \in S(n_i)$, setting a transition probability $P_{ij}=1/(D|h(n_j)-h(n_i)|)$;

determining if all $n_j \in S(n_i)$ with $p_{ij}$ are set, then process to next step, otherwise loop back to the setting transition probability step; and determining if all N beacons with $p_{ij}$, then halt, otherwise loop back to the computing the sum D of beacon $n_i$ step.

15. The method of claim 13, wherein the step of estimating state transition probabilities comprises the steps of:

computing a Voronoi diagram mapping for the beacon constellation;

determining a boundary value L;

for each layer of cells, assigning weight at r-th layer cells to be $a_r$;

for each beacon n, counting the number of neighbours $X_r$ in the r-th layer away, where $0<r\leq L$;

computing the sum $S(n_i)=a_0X_0+a_1X_1+\ldots+a_LX_L$;

for each $n_j$ in the r-th layer of neighbours of ni, assigning the transition probability $$p_{ij} = \frac{a_r}{S(n_i)};$$

incrementing r;

determining if r<L then returning to the assigning the transition probability $p_{ij}$ step, otherwise proceed to next step; and halting if the transition probabilities of all n beacons are set, otherwise returning to counting the number of neighbours step.

16. The method of claim 13, wherein the step of estimating state transition probabilities comprises the steps of:

randomly wandering through the deployment of beacons;

recording the user trace of beacon ID transitions, compute the statistics of the beacon distribution and the a posterior probability distribution; and assigning a transition probability between each pair of states.

17. The system of claim 16, wherein the step of assigning a transition probability comprises a step of using the user trace of beacon IDs are used to estimate the transition probabilities between pairs of beacon IDs.

18. The system of claim 16, wherein the step of assigning a transition probability comprises a step of using Bayesian statistical means or through machine learning algorithms to estimate the transition probabilities.

19. The system of claim 16, wherein the step of assigning a transition probability comprises a step of assigning zero the probability value if no transition exists between two states.

20. The system of claim 13, wherein the status of intrusion comprises either one of:

State H0:(clr c2, ..., crr ..., cT) conforming to the baseline Markov chain model; or State Hx where intrusion or anomalous distribution.

21. The system of claim 19, wherein the hypothesis test comprises the step of:

deriving $p_{ij}(\theta)$, where $1 < i, j < N$, as the transition probability from $ID_i$ to $IDj$ for a n-state Markov chain with $\theta$ being the corresponding set of parameters, for all possible $\theta$ by $\Omega$ for a received user trace C=(clr, cT), deriving a likelihood function as the conditional probability for C to occur given $\theta$, where $L(\theta I\ clr \ldots, Ct) Y\backslash s = IPcrcr + 1(ST)$ computing the likelihood ratio as follows:

$$\Delta = \left( \frac{L(\theta \mid c_1, \ldots, c_T)}{\max_{\theta' \in \Omega \backslash \{\theta\}} L(\theta' \mid c_1, \ldots, c_T)} \right)^{\frac{1}{T}};$$

and accepting H0 (with no intrusion detected) if A>λ where X is the threshold.

22. The system of claim 21, wherein the value of λ is set through a Monte Carlo simulation or trial-and-error.

23. The system of claim 19, wherein the hypothesis test comprises the step of:

collecting user traces of the same length and based on a set of user traces, estimate the probability distribution P(C) of the collected traces where C is a particular user trace;

computing the reference probability distribution Q(C);

computing a KLD, where $$D_{KL}(P\|Q) = -\sum_C P(C) \log \frac{Q(C)}{P(C)};$$

and accept $H_0$ if $D_{KL}(P\|Q) \leq \xi$ where $\xi$ is a threshold.

24. The system of claim 21, wherein the value of λ is set through a Monte Carlo simulation or trial-and-error.

25. An intrusion detection device carrying a method comprising the steps of:

computing a Markov chain based probability distribution for acceptable traces of beacon IDs reported from the terminal device as it queries for location based services or content;

verifying through a hypothesis test to determine whether the received trace of beacon IDs is outside an acceptable value range of the Markov chain based probability distribution in the event that a trace of beacon IDs is outside the acceptable value range, generating a signal indicating that an intrusion occurs.

26. An intrusion detection device of claim 25, wherein the Markov chain based probability distribution is predetermined through Hilbert value, VORONOI diagram or field test with Bayesian statistics or machine learning through DNN.

* * * * *